Sept. 30, 1958  M. M. YAN ET AL  2,854,372
PROCESS FOR FORMING WOOD PARTICLE BOARD AND PRODUCT
Filed Aug. 31, 1954  4 Sheets-Sheet 1

Inventors
Maxwell Menuhin Yan
Henning Borchers
by Stevens, Davis, Miller & Mosher
their attorneys Sept. 30, 1958  M. M. YAN ET AL  2,854,372
PROCESS FOR FORMING WOOD PARTICLE BOARD AND PRODUCT
Filed Aug. 31, 1954  4 Sheets-Sheet 3

United States Patent Office 2,854,372
Patented Sept. 30, 1958

2,854,372

PROCESS FOR FORMING WOOD PARTICLE BOARD AND PRODUCT

Maxwell Menuhin Yan and Henning H. Borchers, Sault Ste. Marie, Ontario, Canada, assignors to Abitibi Power & Paper Company, Limited, Iroquois Falls, Ontario, Canada, a corporation of Canada Application August 31, 1954, Serial No. 453,242

Claims priority, application Canada September 3, 1953

10 Claims. (Cl. 154—101)

This invention relates to particle board and more particularly to a particle board formed from heterodimensional particles, a large proportion of which are oriented substantially parallel both to the surface and to one edge of the board.

Declining timber resources and rising prices make it increasingly important to develop synthetic lumber products, such as wood particle board, which can be made from waste wood at a low cost.

Wood particle board is commonly made as follows. First the wood is reduced to particles by suitable grinding or cutting machines. For example wood chips may be passed through a hammermill to give splinters, or solid wood through a planer or waferizer to produce shavings. Oversize and undersize particles are generally removed by screening. The particles are dried, usually to less than 15% moisture content. They are then mixed with binder, commonly 3–15% of synthetic resin. Next the resinified free-flowing particles are poured from an overhead weigh hopper into horizontal shallow pan molds. The particles are evened out, following which the loose particle pile is precompressed. The mat is then moved into a hot press, with or without the mold, and consolidated with heat and pressure.

A major difficulty in this process is to obtain even initial formation. It is quite a problem to get the same weight of particles per unit area over various areas of the board. Frequently the discharge from the hopper is uneven so that a secondary smoothing operation is necessary, either manual, or mechanical, such as a needle roll. Though this may give an even height of particles in the mold it does not necessarily follow that the desired uniformity has been achieved thereby. Instead of dispersing the excess particles from the high to the low spots, the smoothing process may, in part, only vertically compress the hills in the loose, easily compacted particle network, resulting in uneven density.

The described conventional flat- or random-forming method, as it will be designated henceforth, also produces an unevenness of another sort. The finer particles sift through the loose particle network and concentrate on the bottom. Usually the finer particles, as a result of their greater surface area/weight ratio, are more heavily impregnated with resin than the main body of the furnish. The end result is a two-sided board, with more fines and resin on the bottom surface. Two sidedness is basically undesirable because such unbalance may cause warping of the board when the humidity changes. Usually, therefore, the finer particles must be removed to minimize this two-sidedness, with consequent waste.

It is an object of our invention to reduce greatly both types of formation inequality so as to provide a board having a substantially uniform distribution of fibers between its surfaces and a substantially uniform density.

In the usual pressed wood board the particles are randomly arranged. Hence strength, stiffness, hygroscopic expansion and other properties are about the same in all directions. This non-directional character is frequently extolled as a virtue, which indeed it is in many applications. However it is often more desirable to have a concentration of properties, say of strength, in one direction, strength in the other direction being a minor consideration. Natural lumber provides this directional character while the random flat-formed particle board does not. Even if the particles were perfectly bonded to each other strength could not be more than the average of the strengths of the original wood with and across the grain, or slightly greater than half the strength of lumber in the strongest direction.

It is a further object of our invention to produce a board with an oriented character or grain by alignment of the constituent particles, hence reconstructing the directional character of lumber to a considerable degree yet still avoiding its structural defects. For most applications strength is required in only one direction of the board, hence a board with its particles oriented in one direction provides increased strength where that strength is needed. This property can be used to provide a board with increased effective strength or to provide a board in which a decreased quantity of costly binder is required to achieve a given strength.

Our invention is based on the idea of edge-forming the board in place of the conventional flat-forming technique. When heterodimensional particles such as splinters or shavings are projected in a direction parallel to the surfaces of the board to build up the board from one edge thereof, an orientation parallel to that edge of a large proportion of the particles is achieved. An individual particle projected at a random orientation towards a partially built up section of board will tend to swing into a position parallel to the edge of the section upon being brought to rest by the portion which has been built up. If the loose mass thus formed is subject to consolidating pressure normal to the surface of the board, the particles will tend to flatten out in a direction parallel to the surface of the board. Thus a board is achieved in which the particles are oriented parallel both to the surfaces of the board and to one edge thereof.

While it is primarily contemplated that the particles used in forming the board will be of wood it is apparent that other fibrous material can be used. The best results are likely to be achieved with splinter shaped particles but our invention is also applicable to boards formed from shavings, excelsior-like strands and other heterodimensional particles, that is to say where the individual particle does not have uniform dimensions in each direction.

The most convenient arrangement in accordance with this invention is to allow the particles to fall under the influence of gravity to build up the board in a vertical direction. However it is contemplated that the invention could also be carried out by projecting the particles in, for example, a horizontal direction to build up a horizontally disposed board.

In the drawings which illustrate the preferred embodiments of our invention:

Figure 1:
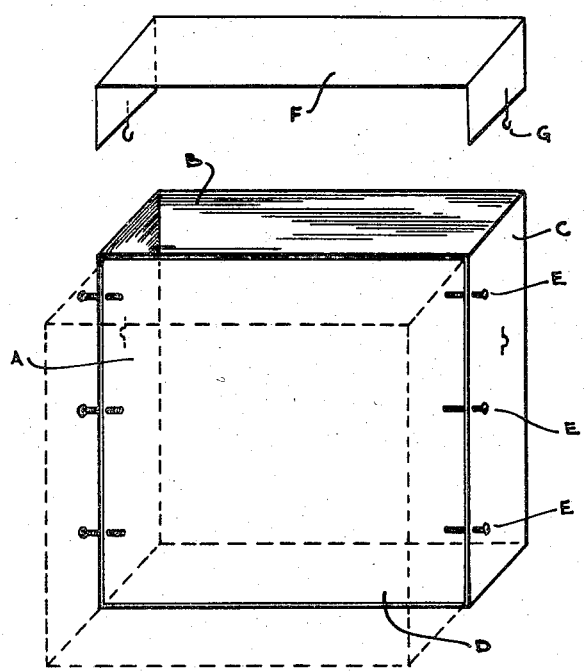
Figure 1 is a perspective view of a vertical box mold adapted for use in carrying out the invention as a batch process.
Figure 7:
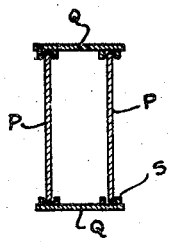
Figure 7 is a sectional view on the line 1—1 of Figure 6.

The box mold shown in Figure 1 is preferably made of metal. It includes facing sheet A and backing sheet B, side panels C and base member D. Sheets A and B must be parallel to each other at all points. The distance between A and B will depend on the final caliper and density of board desired. For a 0.5 in. splinter board of 0.7 specific gravity, for example, the distance will be about 2.5 in.

The facing sheet, A, is fastened to the rest of the box by slip bolts, clamps or other suitable means, E, in such a way that the fastening is easily removed to allow free movement of face A towards face B.

The edge-formed board is made as follows. Splinter shaped particles are rained into the top open edge of the box mold in the vertical direction. Typical particle dimensions are ¼" to ¾" in length, and 1/64" to 1/8" thick. Any reasonably uniform method of feed will be satisfactory. When the box is full a lid, F, is fastened in place over the top open edge with hooks, G, or other suitable means. The entire box is then turned to the horizontal position with the movable face A uppermost. Face A is freed by removal of the fastenings E. The whole assembly is then placed in a cold press for precompression and then into a hot press for final consolidation. Finally the mold is removed from the press, face A is lifted off and the board removed from the mold.

This method avoids the formation inequalities of the flat-forming method. The box gives a positive control of particle weight/unit board area, limited only by the parallelism obtainable between faces A and B. An uneven particle flow is not fatal to formation since all parts of the box must perforce eventually be filled. No secondary smoothing devices of doubtful efficiency are needed. There is no tendency for the fines to collect on the eventual bottom surface so that an edge-formed board is not two-sided like a flat-formed board. There is some vertical settling of fines in the initial formation but the effect of such a settling is minor and is eliminated in a continuous unit such as that shown in Figure 6, where fines settling down are continuously replaced from above.

Figure 2:
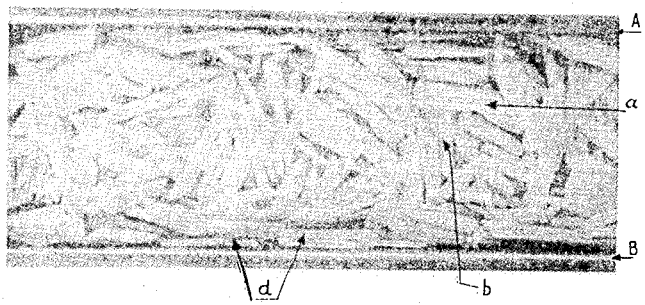
Figure 2 shows the arrangement of wood particles of the splinter type in the vertical box mold of Figure 1 before precompression.

Besides better formation, the edge-forming technique gives an alignment of the particles. When wood splinters are poured into the vertical box mold as described, very few come to rest in the vertical position. They lie flat in the place parallel to the floor, in directions varying from parallel to perpendicular to the board faces as illustrated by particles $a$ and $b$ respectively (Figure 2). Particles close to the smooth confining faces A and B are aligned parallel to these faces as can be seen at $d$ in Figure 2.

Figure 3:
Figure 3 shows the arrangement of the wood splinters when the mold has been turned to the horizontal position and the particle network horizontally precompressed.

When the mold is turned to the horizontal, the $b$ particles are now lying vertically. When pressure is exerted these particles are pushed away from the vertical. Their final position is mainly the same as that of the $a$ and $d$ particles, since this direction of displacement is the path of least resistance. The result is an alignment of the splinters in one direction as shown in Figure 3.

Figure 4:
Figure 4 is a picture of a finished board, illustrating the oriented nature of the product of the invention.
Figure 5:
Figure 5 is a picture of the top surface of a non-oriented board made in the conventional way.

The final effect is pictured in Figure 4 which shows the oriented character of the edge-formed board in contrast to the random formation of the flat-formed board, shown in Figure 5.

While in the example described splinters were used, the method is similarly applicable to shavings, excelsior-like strands and other wood particle types. A typical screen analysis of the splinters is as follows:

Table I.—*Typical screen analysis of splinters*

| U. S. Sieve No. | Mesh Opening, In. | Percent Held on Sieve | Average Splinter Length, in. |
|---|---|---|---|
| 6 | 0.131 | 4.5 | 0.42 with maximum of 0.75 in. |
| 8 | 0.100 | 12.8 | 0.41. |
| 12 | 0.065 | 27.5 | 0.30. |
| 16 | 0.0445 | 29.0 | 0.25. |
| fines {30 | 0.0232 | 19.7 | about 0.10 to 0.25. |
| {through 30 |  | 6.5 | about 0.10 down to flour. |
|  |  | 100.0 |  |

Comparison of Figures 4 and 5 shows the superior appearance of the edge-formed board. Both boards were made from the same splinters yet the random-formed board of Figure 5 appears far coarser. This is because the fines have sifted away from the top surface and because the splinters are far less regularly arranged and packed than in the edge-formed board. Because of the better packing the edge-formed board has a smoother surface with fewer large voids.

The close aligned packing of the particles leads also to a better basic bond between the particles. This in turn gives the edge-formed boards distinctly better resistance to the destructive effects of the weather.

The superior character of the edge-formed boards is further shown in Table II. This compares the properties of 0.5 in. boards of 0.7 specific gravity made from the same bark-free spruce splinters and the same amount of urea-formaldehyde resin, 3% solids based on final dry weight, by techniques identical in all respects but the method of formation.

While urea-formaldehyde resin was used in this example, the edge-forming method is equally applicable with a wide variety of binder.

Table II

|  | Edge-Formed | Flat-Formed |
|---|---|---|
| Variation in wt./unit area, mean, percent | 1.7 | 3.4 |
| Variation in moisture—free specific gravity, mean, percent | 2 | 3 |
| Variation in modulus of rupture: |  |  |
| mean, percent | 6.6 | 10.6 |
| maximum, percent | 15 | 25.5 |
| Modulus of rupture: |  |  |
| Break against alignment, p. s. i. | 2,740 | 1,980 |
| Break parallel to alignment, p. s. i. | 1,350 |  |
| Modulus of elasticity: |  |  |
| Bent against alignment, p. s. i. | 373,000 | 208,000 |
| Bent parallel to alignment p. s. i. | 129,000 |  |

Over an 18 in. square board, calculated from the deviations of numerous individual values from the average value of the property being considered.
Adjusted to specific gravity 0.70.

Table II shows clearly that the edge formed board has a more uniform formation. This improved formation combined with the reduction of two-sidedness reduces the tendency of the board to warp with changing humidity. Better formation is reflected in more uniform flexural strength over the board. It will be noted that the variation in weight per unit area is less than about 2%.

The effect of alignment is shown by a considerable increase in strength and stiffness in one direction. The modulus of rupture is raised 760 p. s. i. or about 40% by the alignment. It would require 5% instead of 3% resin to bring the modulus of rupture of the random-formed board to that of the oriented in the strong direction. Since resin cost is a major proportion of the manufacturing cost of particle board, edge-forming can save money by reducing the resin required for a given strength.

The modulus of elasticity is distinctly greater for the edge-formed board, again considering one direction. Flexed against the alignment direction they bend about one-third less than random boards at the same load. It will be noted that in the edge-formed board the modulus of rupture for a break against alignment is about twice the modulus of rupture for a break parallel to the alignment and that the modulus of elasticity when the board is bent against alignment is about three times the figure for a bend parallel to the alignment.

Similar results are obtained when thin wood shavings are used instead of splinters. For example, the modulus of rupture of an edge-formed shavings board was 5200 p. s. i. in the strong direction, as against only 3600 p. s. i. for the corresponding random-formed board. Shavings having a thickness of 0.005" to 0.030", a length of 0.5" to 2.5" and a width of 0.03" to 1" are suitable.

Figure 6:
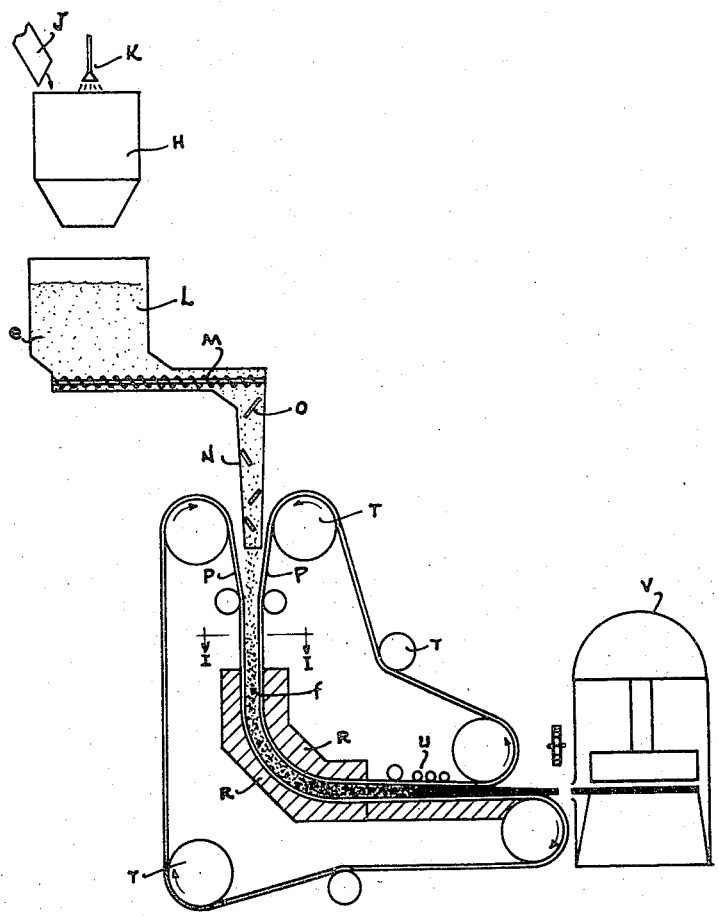
Figure 6 is an elevation view of a continuous forming method embodying the principle of our invention.

Figure 6 shows a continuous edge-forming apparatus. Wood particles are fed into mixing chest H through chute J where they are treated with resin by spray K. The resinified particles e are allowed to fall into hopper L from whence they are transferred by screw M to chute N. The particles fall through chute N and are dispersed on the way by baffles O. They come to rest between two moving endless parallel steel bands or closely meshing caterpillar treads P between which they are confined by upright side wall Q. The board mat $f$ is formed between bands P. The bands ride between guides R and are confined in tracks S in plates Q. Rollers T support the bands. The steel bands carry the mat from a vertical to a horizontal position. The mat is then precompressed by rollers U and transferred to heated platen press V where it is subjected to an elevated temperature and pressure to cure the resin binder and achieve final consolidation.

It is apparent from the foregoing that the invention provides a better method of forming, the result of which is a board with a unique directional character which is superior to the conventional product.

We claim:

1. A process for forming wood particle board from heterodimensional particles comprising the steps of first orienting particles parallel to one edge of the finished board by freely projecting heterodimensional splinter shaped particles and binder towards one edge of the finished board from the direction of the opposite edge of the finished board to build up the board from said one edge in a series of horizontal layers of particles and secondly orienting said particles parallel to the surface of the board without changing said orientation of the particles parallel to said one edge of the finished board consolidating said board with heat and pressure applied normal to the surface thereof to cure the binder and to provide a particle board having particles predominantly oriented with their long axes substantially parallel to said one edge of the board and to the surfaces of the board.

2. A process for forming wood particle board from heterodimensional particles comprising the steps of depositing by free gravity fall successive horizontal layers of heterodimensional splinter shaped particles and binder within a vertically extending space having a long horizontal dimension and a short horizontal dimension perpendicular to the long dimension, applying pressure in the direction of said short dimension to provide a compacted board having particles predominantly oriented in a horizontal direction and in a direction substantially parallel to said long dimension and curing said binder.

3. A process as in claim 2 in which said vertically extending space has a short horizontal dimension adapted to provide a thickness of about half an inch for the compacted board and in which the length of about 89% of said splinter-shaped particles is between about 0.1 and 0.4 inch.

4. In a process for forming wood particle board from elongated particles in the shape of splinters the steps of depositing said particles between forms by freely projecting the particles in a direction parallel to the surfaces of the board to build up the board from one edge thereof in a series of hoizontal layers of particles, thereby orienting a substantial proportion of said particles with their long axis parallel to said one edge and applying compression normal to the surfaces of the board to consolidate the board and to turn a substantial proportion of said particles to an orientation such that their long axes are parallel to the surface of the board.

5. A process as in claim 4 in which the particles are projected downwardly under the influence of gravity to form a vertically extending board.

6. A wood particle board comprising elongated splinter shaped particles with the long dimension of a large proportion of the particles oriented substantially parallel to one edge of the board and parallel to the surface of said board, fines uniformly distributed with respect to the surfaces of the board and a binder for said particles and for said fines.

7. A wood particle board as in claim 6 in which the majority of the particles have a length of about ¼" to ¾" and thickness of about $\frac{1}{64}$" to ⅛" and in which the thickness of the board is about half an inch.

8. A wood particle board as in claim 6 in which the majority of the particles are shaving with a thickness of 0.005" to 0.030", a length of 0.5" to 2.5" and width of 0.3" to 1".

9. A wood particle board comprising elongated splinter shaped particles with the long dimension of a large proportion of the particles oriented substantially parallel to one edge of the board and parallel to the surface of said board, fines uniformly distributed with respect to the surfaces of the board and a binder for said particles and for said fines, said board being of uniform density.

10. A wood particle board as in claim 8 in which the mean percentage variation in weight per unit area is less than about 2%.

References Cited in the file of this patent

UNITED STATES PATENTS

| | | |
|---|---|---|
| 1,931,570 | Brown | Oct. 24, 1933 |
| 2,446,304 | Roman | Aug. 3, 1948 |
| 2,493,194 | Heino | Jan. 3, 1950 |
| 2,510,229 | Joa | June 6, 1950 |
| 2,571,334 | Browne | Oct. 16, 1951 |
| 2,592,521 | Thompson | Apr. 8, 1952 |
| 2,635,301 | Schubert et al. | Apr. 21, 1953 |
| 2,642,371 | Fahrni | June 16, 1953 |
| 2,658,847 | MacDonald | Nov. 10, 1953 |
| 2,686,143 | Fahrni | Aug. 10, 1954 |
| 2,717,420 | Roy | Sept. 13, 1955 |
| 2,728,939 | Behr | Jan. 3, 1956 |

FOREIGN PATENTS

| | | |
|---|---|---|
| 561,489 | Great Britain | May 22, 1944 |
| 701,268 | Great Britain | Dec. 23, 1953 |
| 985,842 | France | Mar. 14, 1951 |